United States Patent
Chen

(10) Patent No.: US 7,434,420 B2
(45) Date of Patent: Oct. 14, 2008

(54) PROCESS FOR GLASS MOLDING

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 156 days.

(21) Appl. No.: 11/285,478

(22) Filed: Nov. 21, 2005

(65) Prior Publication Data

US 2006/0107695 A1    May 25, 2006

(30) Foreign Application Priority Data

Nov. 19, 2004    (CN) ......................... 2004 1 0052391

(51) Int. Cl.
*C03B 3/00* (2006.01)
(52) U.S. Cl. ........................ 65/29.19; 65/17.1; 65/29.12; 65/305
(58) Field of Classification Search .................. 65/64, 65/29.19
See application file for complete search history.

(56) References Cited

U.S. PATENT DOCUMENTS

| 6,099,765 A * | 8/2000 | Yamanaka et al. ............ 264/2.4 |
| 2005/0172671 A1 * | 8/2005 | Yoneda et al. .................. 65/64 |

* cited by examiner

*Primary Examiner*—Philip C Tucker
*Assistant Examiner*—Phu H Nguyen
(74) *Attorney, Agent, or Firm*—Morris Manning Martin LLP; Tim Tingkang Xia, Esq.

(57) ABSTRACT

A process for glass molding includes the steps of: gradually increasing a working temperature to a formation temperature $T_1$ while maintaining a normal pressure and an initial mold position; maintaining the formation temperature $T_1$ for about 60 seconds, and during this period; increasing the normal pressure to a first pressure $P_3$, the first pressure $P_3$ being in the range of 200-400 newtons; increasing the first pressure $P_3$ to a second pressure $P_2$, the second pressure $P_2$ being in the range of 500-700 newtons; increasing the second pressure $P_2$ to a formation pressure $P_1$, the formation pressure being in the range of 700-900 newtons; decreasing the formation pressure $P_1$ to a cooling pressure $P_4$; gradually decreasing the formation temperature $T_1$ to a slow-cooling temperature $T_3$ while maintaining the cooling pressure $P_4$ and gradually de-compacting the mold position.

16 Claims, 5 Drawing Sheets

PROCESS FOR GLASS MOLDING

FIELD OF THE INVENTION

The present invention generally relates to methods for glass molding, and more particularly to a method for molding glass material to make products such as glass lenses.

BACKGROUND

Currently, digital camera modules are included as a feature in a wide variety of portable electronic devices. Most portable electronic devices are becoming progressively more miniaturized over time, and digital camera modules are correspondingly becoming smaller and smaller. Nevertheless, in spite of the small size of a contemporary digital camera module, consumers still demand excellent imaging. The image quality of a digital camera is mainly dependent upon the optical elements of the digital camera module.

Aspheric lenses are very important elements in the digital camera module. An aspheric lens can easily focus an image on an imaging point, because the aspheric lens can attain different reflective refractive indexes by means of selected different materials and profiles. Therefore an aspheric lens can avoid many of the image-forming problems of spherical lenses. In addition, with a single aspheric lens, the number of lens pieces in the camera is minimized. Thus the camera can have a reduced size. Two or more aspheric lenses may be used in some cameras for high quality image forming. Contemporary aspheric lenses are made of plastic or glass. Plastic aspheric lenses are generally manufactured by way of injection molding. Though the cost of plastic aspheric lenses is relatively low, plastic aspheric lens generally provide low image-forming quality compared to glass aspheric lenses. This is because the transparency of the plastic used is lower than that of glass.

Glass aspheric lenses are generally manufactured by way of glass molding. However, such glass aspheric lenses often have a high degree of surface roughness, because the glass molding process is difficult to control. A molded glass aspheric lens should be polished smooth. Nevertheless, the polishing process is difficult to perform because the glass aspheric lens has at least one aspheric surface. Therefore, the overall cost of molding glass aspheric lenses is escalated.

What is needed is a process for glass molding which can overcome the above-described problems.

SUMMARY

A process for molding glass material using a mold, comprising the steps of: gradually increasing a working temperature to a formation temperature $T_1$ while maintaining a normal pressure and an initial mold position, the formation temperature $T_1$ being 25-45° C. higher than a glass transition temperature Tg of the glass material; maintaining the formation temperature $T_1$ for about 60 seconds, and during this period; increasing the normal pressure to a first pressure $P_3$, the first pressure $P_3$ being in the range of 200-400 newtons, and maintaining the first pressure $P_3$ for about 5 seconds while gradually compacting the mold position; increasing the first pressure $P_3$ to a second pressure $P_2$, the second pressure $P_2$ being in the range of 500-700 newtons, and maintaining the second pressure $P_2$ for about 10 seconds while gradually compacting the mold position; and increasing the second pressure $P_2$ to a formation pressure $P_1$, the formation pressure being in the range of 700-900 newtons, and maintaining the formation pressure $P_1$ for about 45 seconds while holding the mold in a most compacting position; decreasing the formation pressure $P_1$ to a cooling pressure $P_4$, the cooling pressure being in the range of 300-500 newtons; and gradually decreasing the formation temperature $T_1$ to a slow-cooling temperature $T_3$ while maintaining the cooling pressure $P_4$ and gradually de-compacting the mold position, the cooling temperature being 5-25° C. lower than the glass transition temperature Tg.

An apparatus for glass molding includes an upper mold, a lower mold, a heating feedback system, a cooling system, a pressurizing system, a main controlling system. The heating feedback system is for controlling a glass molding temperature. The cooling system is for cooling a glass molding under a controlled pressure. The pressurizing system is for controlling the glass molding pressure. The heating feedback system, the cooling system, and the pressure system are connected to the main controlling system.

Other advantages and novel features will become more apparent from the following detailed description when taken in conjunction with the accompanying drawings, in which:

DETAILED DESCRIPTION OF PREFERRED EMBODIMENTS

Figure 1:
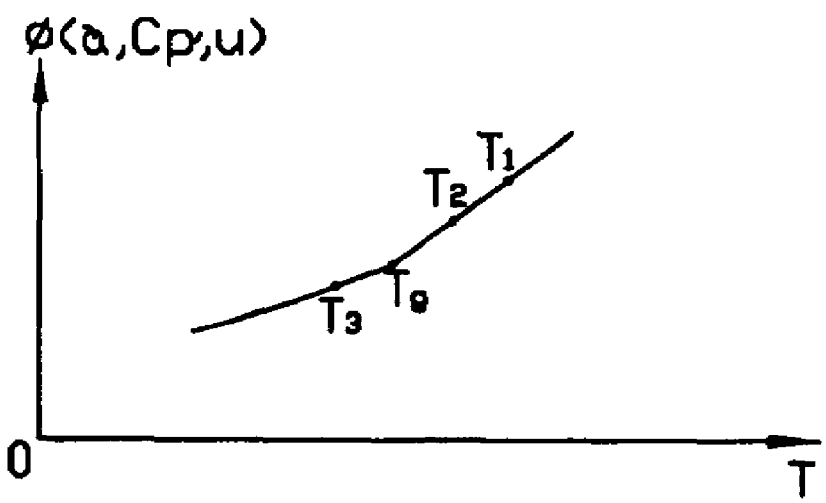
FIG. 1 is a graph of physical parameters (φ) versus temperature (T) for glass material applicable to the present invention.

Referring to FIG. 1, the y axis φ (α, Cp, μ) thereof represents physical parameters of a glass material for glass molding. The physical parameters include thermal expansion coefficient (α), heat capacitance (Cp), and viscosity (μ). The physical parameters are each a function of temperature. In the graph, $T_1$, $T_2$, Tg, and $T_3$ are a formation temperature, switching temperature, glass transition temperature, and slow-cooling temperature respectively. Various glass materials have different glass transition temperatures (Tg). When a particular glass material is chosen for molding, the corresponding glass transition temperature (Tg) is ascertained. The formation temperature ($T_1$) is 25-45° C. higher than the glass transition temperature (Tg), the switching temperature ($T_2$) is 5-15° C. higher than the glass transition temperature (Tg), and the slow-cooling temperature ($T_3$) is 5-25° C. lower than the glass transition temperature (Tg).

Figure 2:
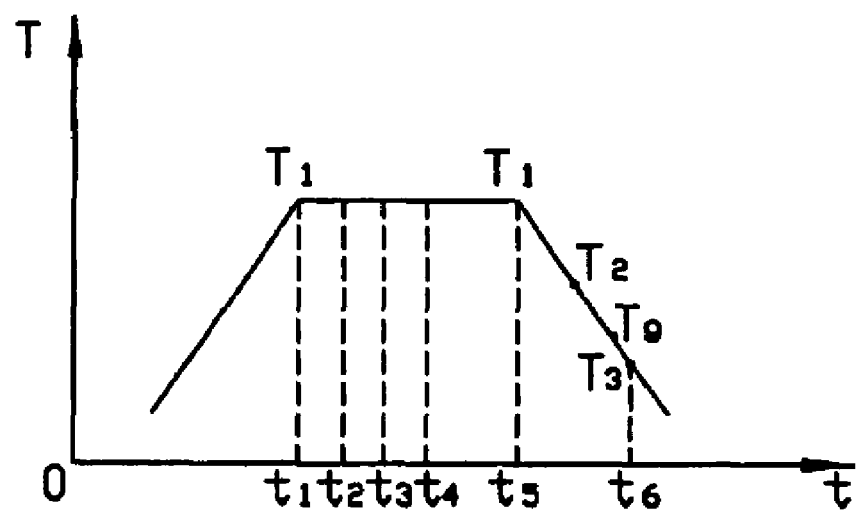
FIG. 2 is a graph of temperature (T) variation versus time (t), in accordance with a preferred process embodiment of the present invention.

Referring to FIG. 2, in a preferred embodiment of the present invention, the preferred glass transition temperature Tg is 506° C. The formation temperature $T_1$ is preferred to be 30-35° C. higher than the glass transition temperature Tg. In the illustrated embodiment, a predetermined formation temperature $T_1$ is 540° C. The graph shows the changes of temperature during the glass molding process. In the process of glass molding: first, a preform made of glass material is slowly and steadily heated to the formation temperature $T_1$, which is reached at time $t_1$; from time $t_1$ to time $t_2$ (generally about 10-15 seconds), the formation temperature $T_1$ is maintained; from time $t_2$ to time $t_5$ (generally about 60 seconds), the preform is extruded at the formation temperature $T_1$; from time $t_5$ to time $t_6$ (generally about 15 seconds), the preform is slowly and steadily cooled to decrease the formation temperature $T_1$ to the switching temperature $T_2$, and thereafter the preform continues to slowly and steadily cool from the switching temperature $T_2$ to the slow-cooling temperature $T_3$, which is reached at time $t_6$. The preferred switching temperature $T_2$ is 10-15° C. higher than the glass transition temperature Tg. The preferred slow-cooling temperature $T_3$ is 10-20° C. lower than the glass transition temperature Tg. The optimal slow-cooling temperature $T_3$ is 490° C.

Figure 3:
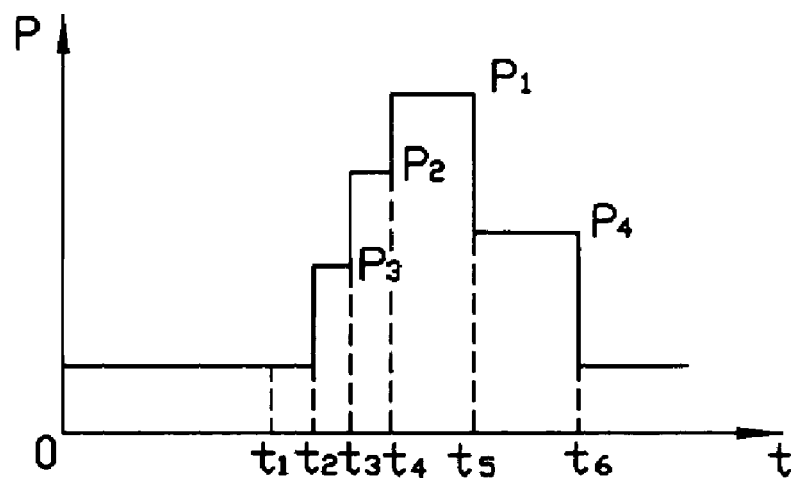
FIG. 3 is a graph of pressure (P) variation versus time (t), in accordance with the preferred process embodiment of the present invention.

Referring to FIG. 3, this graph shows pressing force variation during the extruding process of the glass molding process. The time intervals $t_1$ through $t_6$ in FIG. 3 correspond to the time intervals $t_1$ through $t_6$ in FIG. 2. In the extruding process: from time $t_1$ to time $t_2$, a normal pressing force is maintained on the glass material by the mold; at time $t_2$, the normal pressing force is increased to a first pressing force $P_3$; from time $t_2$ to time $t_3$ (generally about 5 seconds), the first pressing force $P_3$ is maintained; at time $t_3$, the first pressing force $P_3$ is increased to a second pressing force $P_2$; from time $t_3$ to time $t_4$ (generally about 10 seconds), the second pressing force $P_2$ is maintained; at time $t_4$, the second pressing force $P_2$ is increased to a formation pressing force $P_1$; from time $t_4$ to time $t_5$ (generally about 45 seconds), the formation pressing force $P_1$ is maintained; at time $t_5$, the formation pressing force $P_1$ is decreased to a cooling pressing force $P_4$; from time $t_5$ to time $t_6$ (generally about 15 seconds), the cooling pressing force $P_4$ is maintained; and at time $t_6$, the cooling pressing force $P_4$ is decreased to the normal room pressing force. The preferred first pressing force $P_3$ is in the range of 200-400 newtons, and the optimal first pressing force $P_3$ is 300 newtons. The preferred second pressing force $P_2$ is in the range of 500-700 newtons, and the optimal second pressing force $P_2$ is 600 newtons. The preferred formation pressing force $P_1$ is 800 newtons. The preferred cooling pressing force $P_4$ is in the range of 300-500 newtons, and the optimal cooling pressing force $P_4$ is 400 newtons.

Figure 4:
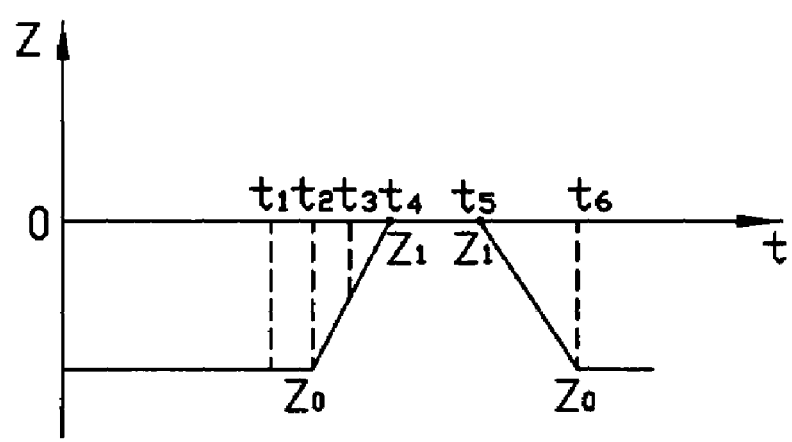
FIG. 4 is a graph of mold position (Z) variation versus time (t), in accordance with the preferred process embodiment of the present invention.

Referring to FIG. 4, this graph shows mold position variation during the glass molding process. In the preferred embodiment of the present invention, the mold is a two-part mold (see FIG. 5), and either or both parts of the mold are movable toward and away from the other part along a common Z axis. The time intervals $t_1$ through $t_6$ in FIG. 4 correspond to the time intervals $t_1$ through $t_6$ in FIGS. 2 and 3. During the glass molding process, the position of the mold varies with variations of the temperature and pressure. In the glass molding process: from time $t_1$ to time $t_2$, the molds is held at an initial position $Z_0$; from time $t_2$ to time $t_4$ (generally about 15 seconds), the mold is slowly and steadily moved from the position $Z_0$ to a most compacting position $Z_1$ during the above-described heating and extruding processes; from time $t_4$ to time $t_5$ (generally about 45 seconds), the mold is held at position $Z_1$; and from time $t_5$ to time $t_6$, the mold is slowly and steadily moved from position $Z_1$ back to position $Z_0$.

Figure 5:
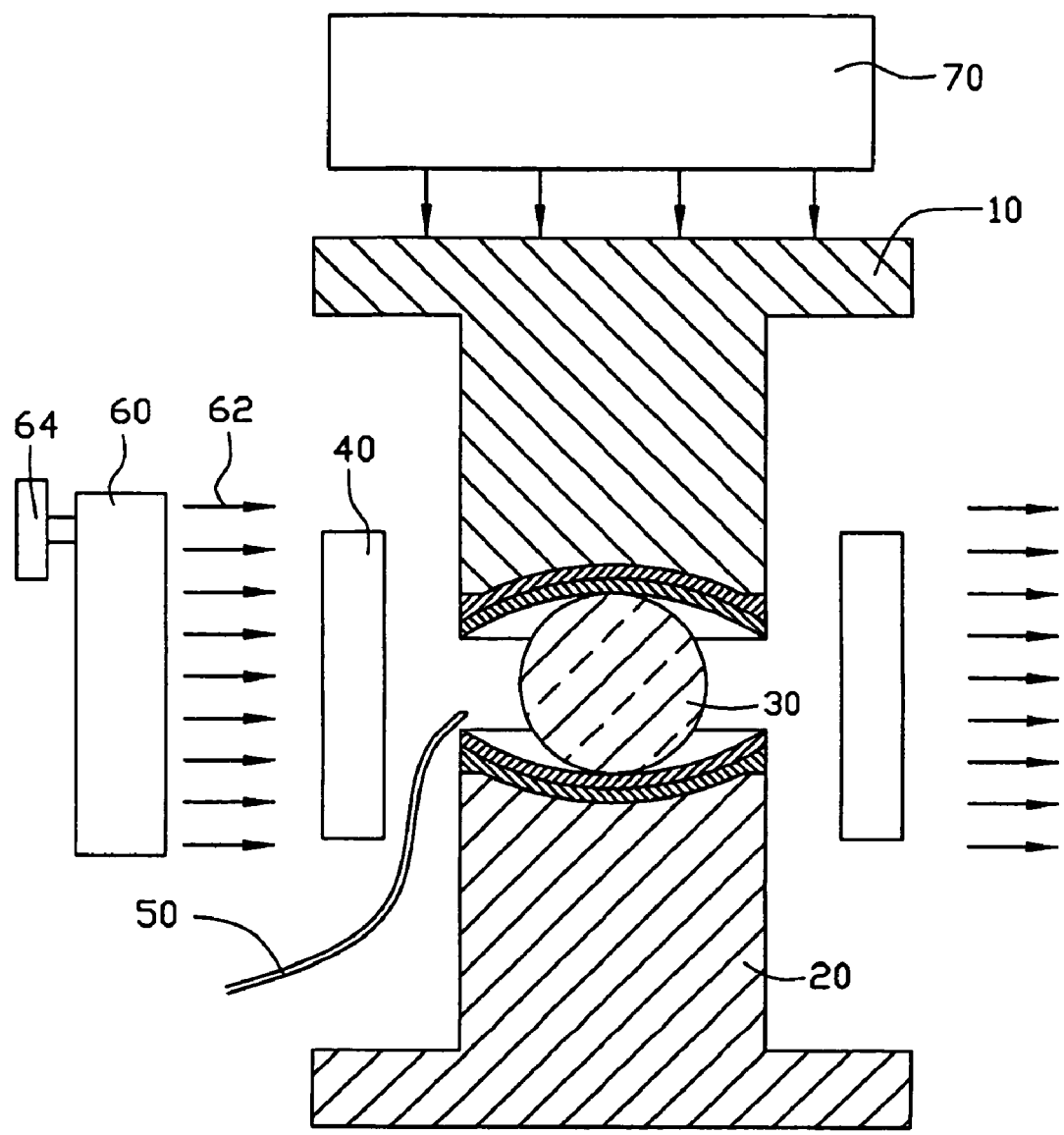
FIG. 5 is a schematic, cut-away view of an apparatus for glass molding in accordance with another preferred embodiment of the present invention.

Referring to FIG. 5, in a preferred embodiment of the present invention, an apparatus for glass molding includes an upper mold 10 and a lower mold 20. A glass preform 30 is disposed between the upper mold 10 and the lower mold 20. The apparatus also includes a main controlling system, a heating feedback system, a cooling system, and a pressurizing system. The heating feedback system, the cooling system, and the pressurizing system are connected to the main controlling system. During the glass molding process, the heating feedback system is used for controlling the heating temperature, the cooling system is used for controlling the cooling temperature, and the pressurizing system is used for controlling changes in applied pressure.

The heating feedback system includes a plurality of infrared heaters 40. The infrared heaters 40 are disposed around the upper mold 10 and the lower mold 20. Preferably, the infrared heaters 40 can be symmetrically disposed at two opposite sides of a region surrounding a bottom portion of the upper mold 10 and a top portion of the lower mold 20, for heating these operative portions of the upper mold 10 and the lower mold 20 uniformly. The infrared heaters 40 have sufficient power to rapidly heat the glass preform 30 to a predetermined temperature. The heating feedback system also includes a thermocouple 50, for detecting the temperature of the glass preform 30. The thermocouple 50 is made of an alloy of iron and copper, which is sensitive to changes in temperature. The thermocouple 50 can transfer the detected temperature to the main controlling system.

Figure 6:
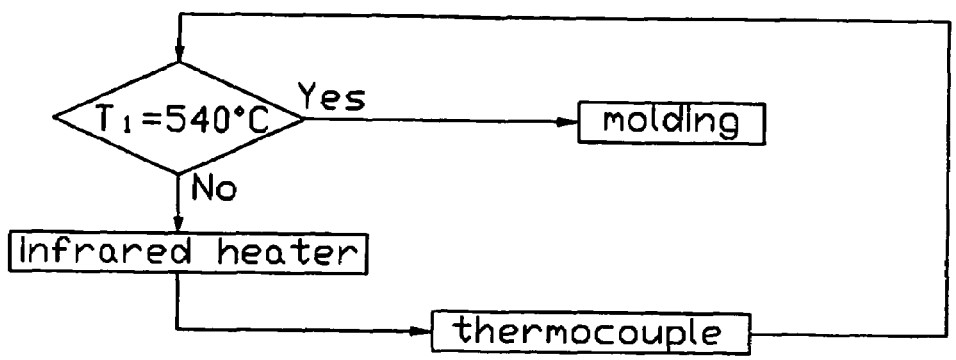
FIG. 6 is a flow chart relating to operation of a heating system of the apparatus of FIG. 5.

Referring to FIGS. 5 and 6, the heating feedback system is a loop control system, and is mainly for controlling the formation temperature $T_1$. The working process of the heating feedback system includes the steps of: detecting the temperature of the glass preform 30 by using the thermocouple 50; if the temperature of the glass preform 30 is lower than the predetermined formation temperature $T_1$, heating the glass preform 30 with the infrared heater 40 until the temperature of the glass preform 30 reaches the predetermined formation temperature $T_1$; and if and when the temperature of the glass preform 30 has reached the predetermined formation temperature $T_1$, starting the glass molding process.

Referring to FIG. 5, the cooling system mainly includes a gas cooling apparatus 60. The gas cooling apparatus 60 can be disposed one side of the region surrounding the bottom portion of the upper mold 10 and the top portion of the lower mold 20. The gas cooling apparatus 60 includes a mass flow controller 64, and utilizes a cooling gas 62. The cooling gas 62 can be a nitride gas or an inert gas. The inert gas can be argon gas, helium gas, or krypton gas. The mass flow controller 64 is for controlling the flow rate of the cooling gas 62. In high temperature and high pressure glass molding processes, the preferred cooling gas 62 is nitride gas. The cooling gas 62 can prevent surfaces of the mold from being oxidized. Therefore, the mold can provide a long service lifetime.

Figure 7:
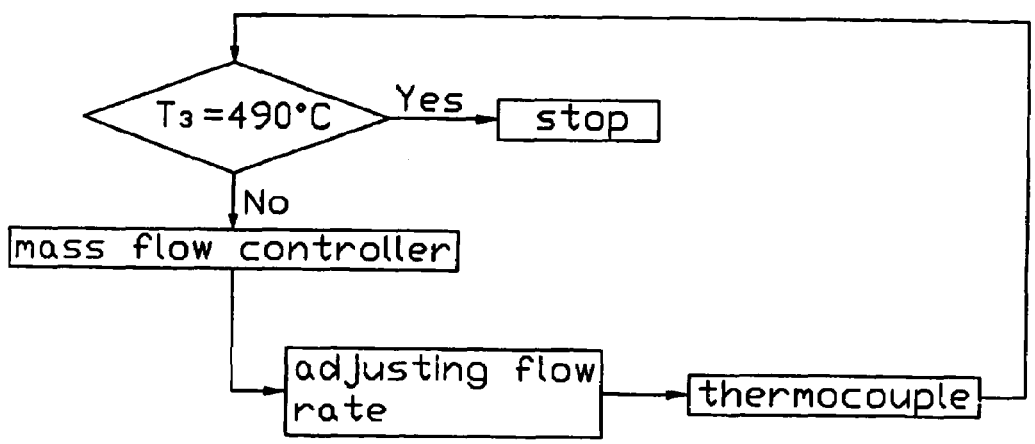
FIG. 7 is a flow chart relating to operation of a cooling system of the apparatus of FIG. 5.

Referring to FIGS. 5 and 7, the working process of the cooling system includes the steps of: detecting the temperature of the glass preform 30 by using the thermocouple 50; if the detected temperature is higher than the predetermined cooling temperature $T_3$, adjusting the mass flow controller 64 to change the mass flow rate of cooling gas, and continuing to cool the glass preform 30 until the temperature of the glass preform 30 has reached the predetermined cooling temperature $T_3$; and if and when the detected temperature has reached the predetermined cooling temperature $T_3$, stopping the cooling system.

Figure 8:
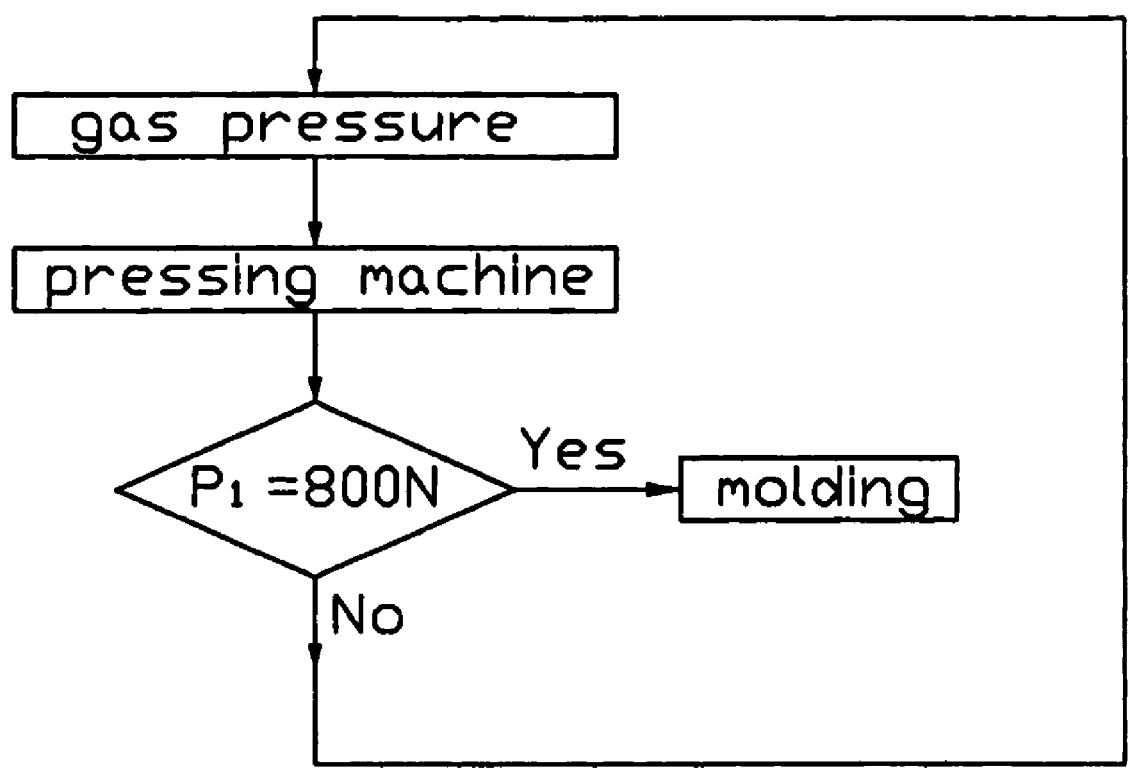
FIG. 8 is a flow chart relating to operation of a pressure system of the apparatus of FIG. 5.

Referring to FIGS. 5 and 8, the pressurizing system includes a pressing machine 70. The pressing machine 70 can press the upper mold 10 by means of gas pressure, oil pressure, electric pressure, or spring pressure. In a preferred embodiment of the present invention, the pressing machine 70 presses the upper mold 10 by means of gas pressure. The pressure system also includes a position measurer for measuring the position of the mold during the glass molding process. The position measurer can convey the measured mold position to the main controlling system, for automatically adjusting the positions of the upper mold 10 and the lower mold 20.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A process for molding glass material using a mold, comprising the steps of:
   gradually increasing a working temperature to a formation temperature $T_1$ while maintaining a normal pressing force and an initial mold position, the formation temperature $T_1$ being 25-45° C. higher than a glass transition temperature Tg of the glass material;
   maintaining the formation temperature $T_1$ for about 60 seconds, and during this period:
      increasing the normal pressing force to a first pressing force $P_3$, the first pressing force $P_3$ being in the range of 200-400 newtons, and maintaining the first pressing force $P_3$ for about 5 seconds while gradually compacting the mold position;
      increasing the first pressing force $P_3$ to a second pressing force $P_2$, the second pressing force $P_2$ being in the range of 500-700 newtons, and maintaining the second pressing force $P_2$ for about 10 seconds while gradually compacting the mold position; and
      increasing the second pressing force $P_2$ to a formation pressing force $P_1$, the formation pressing force $P_1$ being in the range of 700-900 newtons, and maintaining the formation pressing force $P_1$ for about 45 seconds while holding the mold in a most compacting position;
   decreasing the formation pressing force $P_1$ to a cooling pressing force $P_4$, the cooling pressing force $P_4$ being in the range of 300-500 newtons; and
   gradually decreasing the formation temperature $T_1$ to a slow-cooling temperature $T_3$ while maintaining the cooling pressing force $P_4$ and gradually de-compacting the mold position, the slow-cooling temperature $T_3$ being 5-25° C. lower than the glass transition temperature Tg.

2. The process as claimed in claim 1, wherein the formation temperature $T_1$ is 30-35° C. higher than the glass transition temperature Tg.

3. The process as claimed in claim 2, wherein the formation temperature $T_1$ is 540° C.

4. The process as claimed in claim 1, wherein the slow-cooling temperature $T_3$ is 10-20° C. lower than the glass transition temperature Tg.

5. The process as claimed in claim 4, wherein the slow-cooling temperature $T_3$ is 490° C.

6. The process as claimed in claim 1, wherein the first pressing force $P_3$ is about 300 newtons, the second pressing force $P_2$ is about 600 newtons, the formation pressing force $P_1$ is about 800 newtons, and the cooling pressing force $P_4$ is about 400 newtons.

7. A method to manufacture a glass product, comprising the steps of:
   placing a preform of a glass product in molds to form said glass product;
   gradually increasing a working temperature of said preform in said molds to a predetermined temperature and maintaining said predetermined temperature for a first predetermined period;
   instantaneously greatening a pressing force applied onto said preform in said molds on at least three occasions during said first predetermined period while maintaining said predetermined temperature so as to achieve a predetermined maximum pressing force;
   maintaining said predetermined maximum pressing force for a second predetermined period; and
   cooling said preform in said molds under pressing force less than said maximum pressing force so as to acquire said glass product;
   wherein on a first one of the occasions said pressing force is instantaneously greatened to a first pressing force in the range from 200 to 400 newtons, on a second one of the occasions the first pressing force is instantaneously greatened to a second pressing force in the range from 500 to 700 newtons, and on a third one of the occasions the second pressing force is instantaneously greatened to said predetermined maximum pressing force, which is in the range from 700 to 900 newtons, the first pressing force being maintained for about 5 seconds until the second occasion.

8. The method as claimed in claim 7, wherein said predetermined temperature is 25-45° C. higher than a glass transition temperature Tg of said preform.

9. The method as claimed in claim 7, wherein said second predetermined period is included in said first predetermined period.

10. The method as claimed in claim 7, wherein during cooling said perform, said predetermined maximum pressing force applied onto said preform is discontinuously decreased to a cooling pressing force, with said cooling pressing force being maintained for a third predetermined period.

11. The method as claimed in claim 7, wherein the first predetermined period is about 60 seconds.

12. The method as claimed in claim 7, wherein the predetermined maximum pressing force is in the range from 700 to 900 newtons.

13. The method as claimed in claim 7, wherein the second predetermined period is about 45 seconds.

14. A method to manufacture a glass product, comprising the steps of:
   placing a preform of a glass product in molds to form said glass product;
   gradually increasing a working temperature of said preform in said molds to a predetermined temperature and maintaining said predetermined temperature for a first predetermined period;
   instantaneously greatening a pressing force applied onto said preform in said molds on at least three occasions during said first predetermined period while maintaining said predetermined temperature so as to achieve a predetermined maximum pressing force;
   maintaining said predetermined maximum pressing force for a second predetermined period; and
   cooling said preform in said molds under pressing force less than said maximum pressing force so as to acquire said glass product;
   wherein on a first one of the occasions said pressing force is instantaneously greatened to a first pressing force in the range from 200 to 400 newtons, on a second one of the occasions the first pressing force is instantaneously greatened to a second pressing force in the range from 500 to 700 newtons, and on a third one of the occasions the second pressing force is instantaneously greatened to said predetermined maximum pressing force, which is in the range from 700 to 900 newtons, the second pressing force is maintained for about 10 seconds until the third occasion.

15. The method as claimed in claim 7, wherein during cooling said preform in said molds, said predetermined maximum pressing force is decreased to a cooling pressing force in the range from 300 to 500 newtons.

16. The method as claimed in claim 7, wherein during cooling said preform in said molds, the temperature of said preform is gradually decreased to a cooling temperature 10-20° C. lower than a glass transition temperature Tg of said preform.

* * * * *